(No Model.)

E. S. LENOX.
BALE TIE.

No. 466,609. Patented Jan. 5, 1892.

Witnesses
Chas. F. Schmidt
Phoebe Sykes

Inventor
Edwin S. Lenox,
By his Attorney
John C. Dewey

UNITED STATES PATENT OFFICE.

EDWIN S. LENOX, OF WORCESTER, MASSACHUSETTS, ASSIGNOR TO THE WASHBURN & MOEN MANUFACTURING COMPANY, OF SAME PLACE.

BALE-TIE.

SPECIFICATION forming part of Letters Patent No. 466,609, dated January 5, 1892.

Application filed March 26, 1891. Serial No. 386,534. (No model.)

*To all whom it may concern:*

Be it known that I, EDWIN S. LENOX, a citizen of the United States, residing at Worcester, in the county of Worcester and State of Massachusetts, have invented certain new and useful Improvements in Bale-Ties; and I do hereby declare that the following is a full, clear, and exact description thereof, which, in connection with the drawings making a part of this specification, will enable others skilled in the art to which my invention belongs to make and use the same.

My invention relates to bale-ties, and more particularly to the fastening-plate adapted to be permanently connected with one end of the tie before the same is passed around the bale and with the other end of the tie after the same has been passed around the bale by inserting said end through a hole in the fastening-plate and bending it over and allowing it to be drawn down into a slot therein by the expansion of the bale when it is removed from the press, thus binding and securing said end of the tie with or without twisting it around the body of the tie.

My invention consists in certain novel features of construction and operation of a bale-tie-fastening plate, as will be hereinafter fully described.

Figure 1:
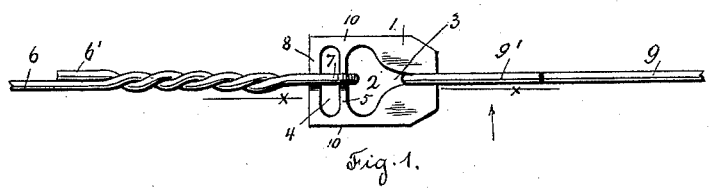
Figure 2:
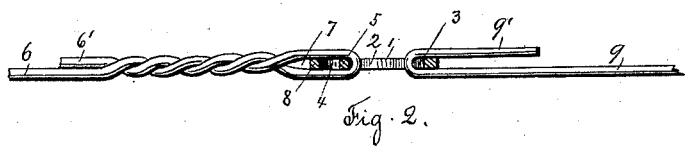
Figure 3:
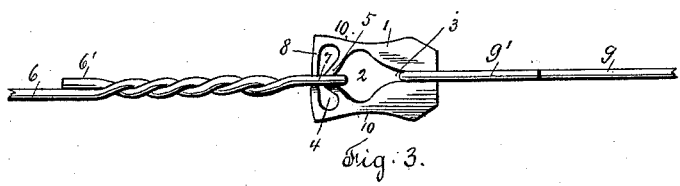
Figure 4:
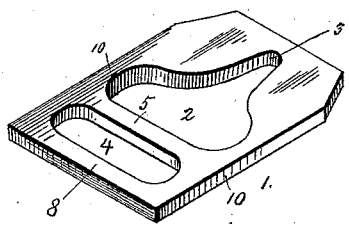

Referring to the drawings, Figure 1 is a plan view of my improved fastening-plate connected with both ends of the tie before the same has been subjected to the expansive force of the bale. Fig. 2 is a section on line *x x*, Fig. 1, looking in the direction of the arrow, same figure. Fig. 3 shows the fastening-plate and the tie ends connected therewith after the same has been subjected to the expansive force of the bale; and Fig. 4 is, on an enlarged scale, a perspective view of the fastening-plate shown in Fig. 1.

In the accompanying drawings, 1 is a metal plate, preferably made of steel, and of oblong shape, as shown in the drawings. In the central part of the plate is stamped or cut out a hole or opening 2, extending to one side to form a slot 3. In the opposite end of the plate from the slot 3 is cut or stamped out an oblong opening or hole 4, of substantially the length equal to the width of the opening 2, leaving a bar 5, extending between the openings 2 and 4. The end 6 of the bale-tie wire has a loop 7 at the end thereof, which extends around and encircles the bar 5 and the end 8 of the plate 1, thus securing the plate 1 to the end 6 of the tie. The loop 7 is formed by inserting the end 6' through the hole 2 in plate 1 and bending it back and intertwisting it with the body of the tie, as shown in the drawings. The other end 9 of the tie, after the tie has been passed around the bale when the same is in the press, is inserted through the opening 2 and bent back upon itself, as shown in the drawings. When the bale is removed from the press after the tie has been applied thereto, as above described, the expansive force of the bale will draw the end 9 down into the slot 3 of the plate 1 and will bend cross-bar 5, causing the sides 10 of the plate 1 to be drawn in toward each other and the edges of the slot 3 to approach each other and grip and hold the end 9 of the wire in said slot, so that the same cannot slip or move therein. By means of the oblong cross-opening 4 in one end of the plate 1 and the cross-bar 5 and the bar 8, I am enabled to draw together the sides 10 of the plate, as shown in Fig. 3, so as to clamp the wire in the slot 2 without lessening the strength of the plate and without danger of breaking the same. If the end of the plate inclosed by the loop 7 was made solid, it would not bend or yield; but by making it with the opening 4 therein I reduce the amount of metal and make it so that it will bend and yield to the expansion of the bale when removed from the press.

Having thus described my invention, what I claim as new, and desire to secure by Letters Patent, is—

1. A fastening-plate for connecting the ends of wire bale-ties, consisting of a plate having an opening therein with a slot leading out therefrom and having a second oblong opening therein extending in the direction of the width of the plate and of a length substantially equal to the width of the first-mentioned opening, and a bar extending between the two openings, substantially as set forth.

2. In a bale-tie, the combination, with a fastening-plate having an opening therein and a slot leading out therefrom, and a second opening therein of a length substantially equal to the width of the first-mentioned opening, and a bar extending between said openings, of one end of the tie adapted to be passed through the first-mentioned opening and bent back and intertwisted with the body of the tie, forming a loop encircling the bar between the two openings and also the end of the fastening-plate, substantially as set forth.

EDWIN S. LENOX.

Witnesses:
JOHN C. DEWEY,
PHOEBE SYKES.